(12) United States Patent
Jones

(10) Patent No.: US 7,654,848 B1
(45) Date of Patent: Feb. 2, 2010

(54) TOOLING GAGE CABLE RETAINER

(75) Inventor: Richard N. Jones, Greenville, MI (US)

(73) Assignee: Aggressive Tooling, Inc., Greenville, MI (US)

( * ) Notice: Subject to any disclaimer, the term of this patent is extended or adjusted under 35 U.S.C. 154(b) by 0 days.

(21) Appl. No.: 12/333,439

(22) Filed: Dec. 12, 2008

Related U.S. Application Data

(60) Provisional application No. 61/013,414, filed on Dec. 13, 2007.

(51) Int. Cl.
 *H01R 4/50* (2006.01)
(52) U.S. Cl. ...................................... 439/345
(58) Field of Classification Search ................. 439/345, 439/366–369, 372, 373, 552
 See application file for complete search history.

(56) References Cited

U.S. PATENT DOCUMENTS

| 2,761,112 | A | 8/1956 | Torcivia | |
|---|---|---|---|---|
| 4,531,800 | A | * 7/1985 | Avener | 439/373 |
| 4,643,505 | A | 2/1987 | House et al. | |
| 4,749,363 | A | 6/1988 | Luska et al. | |
| 4,846,318 | A | * 7/1989 | Groves | 188/282.2 |
| 4,895,527 | A | 1/1990 | Brown et al. | |
| 5,174,773 | A | 12/1992 | Jones | |
| 5,713,758 | A | 2/1998 | Goodin et al. | |
| 5,816,853 | A | * 10/1998 | Buekers et al. | 439/521 |
| 6,375,487 | B1 | 4/2002 | Tennessen | |
| 6,494,735 | B1 | 12/2002 | Chen et al. | |
| 6,752,646 | B2 | * 6/2004 | McCoy | 439/367 |
| 7,438,588 | B2 | 10/2008 | Rhodes et al. | |
| 2005/0255898 | A1 | 11/2005 | Huang | |
| 2008/0146069 | A1 | 6/2008 | Fawcett | |
| 2009/0149055 | A1 | * 6/2009 | Uchikawa et al. | 439/367 |

FOREIGN PATENT DOCUMENTS

WO 99/60670 11/1999

* cited by examiner

*Primary Examiner*—Michael C Zarroli
(74) *Attorney, Agent, or Firm*—McGarry Bair PC

(57) ABSTRACT

A cable retainer for a tooling gage comprises a structure able to hold a cable into a terminal in the gage while still allowing full operation of the gage.

10 Claims, 4 Drawing Sheets

TOOLING GAGE CABLE RETAINER

CROSS-REFERENCE TO RELATED APPLICATION

This application claims the benefit of U.S. Provisional Patent Application No. 61/013,414, filed Dec. 13, 2007, which is incorporated herein by reference in its entirety.

BACKGROUND OF THE INVENTION

1. Field of the Invention

The invention relates to a cable retainer for a tooling gage.

2. Description of the Related Art

It is well known to use hand-held or portable tool instruments to collect real-time data regarding products being manufactured and tooled on a shop floor. Often these instruments are gages that have a digital output. The data from the gage may be transferred from the instrument through a cable to a computer where the data is typically processed for things such as statistical process control. For example, a worker measures a part and gathers dimensional data to determine if the part "as built" matches the specification "as designed." The data collected may be used to correct the manufacturer's process of the part if the part is found to differ from the design.

Because workers can collect data from sample parts at various points within the process, variations in the process that may affect the quality of the end product can be detected and corrected, thus reducing waste as well as the likelihood that problems will be passed on to the customer. By measuring work on the shop floor, instead of waiting until the end of the process, workers can measure the production of parts closer to real time, so the results have more value in controlling the process. An analysis of a part cannot be meaningful unless the gages used to collect data are accurate and the data can be transferred accurately to the computer doing the analysis. SPC cables are typically used to transfer the information from the gage to the computer, allowing the computer to receive streaming data. Vibrations and normal movement on the shop floor, as well as repeated use of the portable instruments, often result in the cable working itself out of the terminal in the gage. This results in the cable frequently becoming partially unplugged or disconnected from the gage and makes the instrument essentially nonfunctional because the continuous digital data output goes nowhere. There is a need to more securely prevent a cable from becoming dislodged from the tooling gage.

SUMMARY OF THE INVENTION

These and other problems are solved by the present invention of a cable retainer that includes a structure to engage the exterior of a tooling gage and designed to prohibit the cable from working free of the terminal in gage.

DESCRIPTION OF EMBODIMENTS OF THE INVENTION

Figure 1:
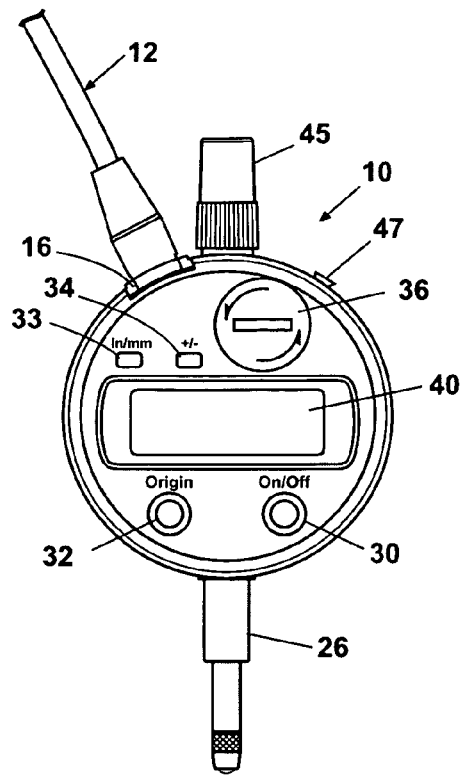
FIG. 1 is a perspective view of a tooling instrument and cable for which a cable retainer according to the invention can be used.
Figure 2:
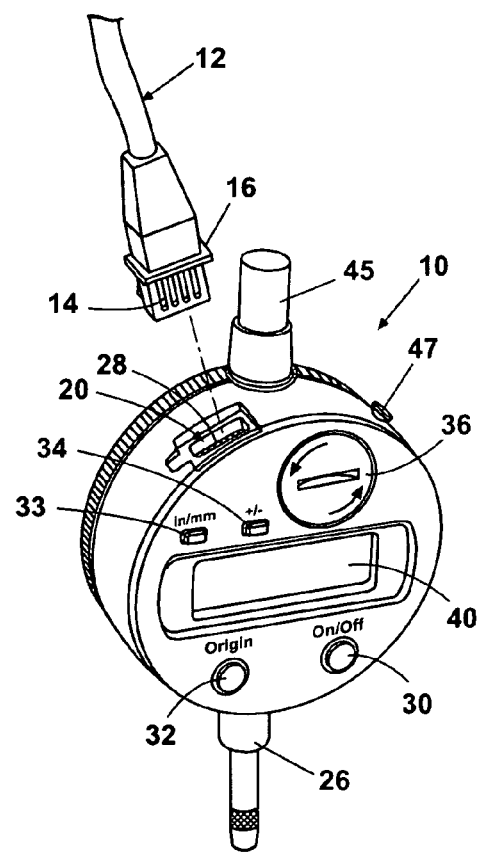
FIG. 2 is an exploded view of the tooling instrument and cable of FIG. 1.

FIGS. 1 and 2 illustrate a tooling instrument 10 such as that to be used with the invention. The tooling instrument 10 may be of any type of digital instrument used in a shop to measure parts and having means to connect a cable transmitting data from the instrument. The specific tooling instrument 10 shown is of a digimatic indicator type made by Mitutoyo. Only relevant portions of the tooling instrument 10 will be discussed. The tooling instrument is generally disk-shaped, having a peripheral wall and an operating face. A spindle 26 for taking measurements projects from the peripheral wall. On the operating face of the tooling instrument 10 is an on/off button 30, an origin button 32 for zeroing the device, read-out buttons 33, 34 for changing the read-out display, a battery cover 36, and an LCD display 40 for displaying the read-out. Projecting from the peripheral wall opposite the spindle 26 is a screw cover 45 and a screw 47. Also, located on the peripheral wall of the tooling instrument 10, but not necessarily projecting from it is a terminal 20.

A SPC cable 12 may be connected to the terminal 20 in the tooling instrument 10 to transfer the data outputted by the tooling instrument 10 to a computer (not shown). The terminal 20 is preferably sized and threaded to receive a contact member 14 of the SPC cable 12. The terminal 20 has female contact members 28 that mate respectively with the cable contact member 14 for a friction-fit connection. It should be noted that the cable contact member 14 may have a small lip 16. As the SPC cable 12 is only held in the terminal 20 by friction and this friction is easily overcome, especially with time and wear, the SPC cable 12 is prone to work itself loose from the terminal 20.

Figure 3:
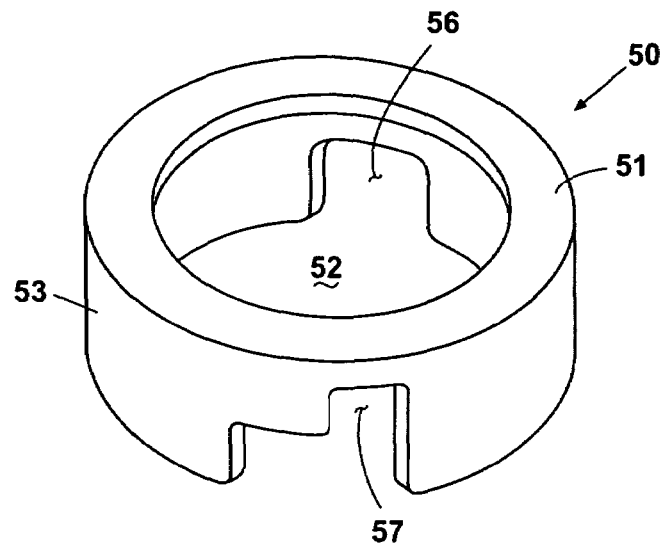
FIG. 3 is a front perspective view of a cable retainer according to the invention.
Figure 4:
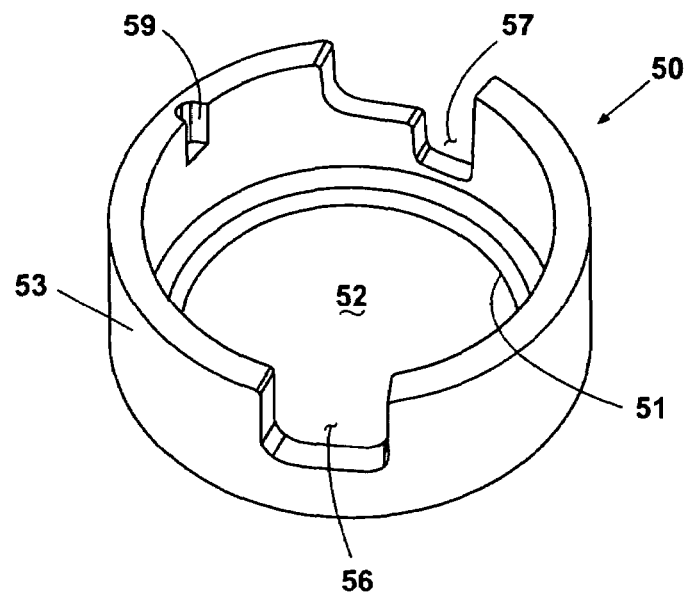
FIG. 4 is a top perspective view of the cable retainer of FIG. 3.
Figure 5:
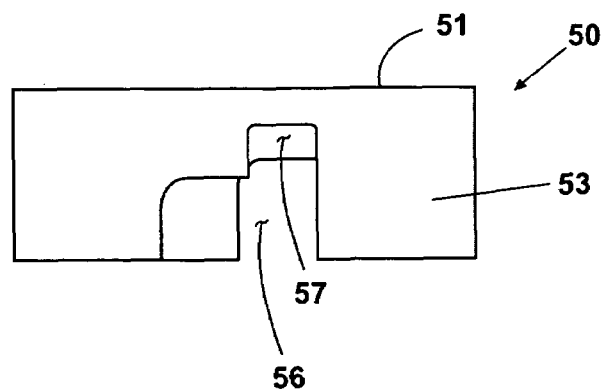
FIG. 5 is a back perspective view of the cable retainer of FIG. 3.

Referring now to FIGS. 3-5, the numeral 50 generally designates a cable retainer according to the invention, which has a configuration based upon the shape and features of the tooling instrument 10 for which it is designed. According to the illustrated embodiment, the cable retainer 50 is made of a rigid plastic that is durable and has the ability to hold the SPC cable 12 in the terminal 20. It has been contemplated that any number of suitable materials could be used to form the cable retainer 50 including either flexible materials such as rubber or nylon or rigid materials such as ceramic, or metal.

The cable retainer 50 has a circular front wall 51 defining a central opening 52. The cable retainer 50 also has an annular sidewall 53 that extends from the circular front wall 51. The annular side wall 53 has cutouts 56, 57 sized and located to correspond with items projecting from the annular side wall 53 of the tooling instrument 10, including the spindle 26 and the screw cover 45 respectively. The annular side wall 53 is dimensioned to tightly fit around the perimeter of the tooling instrument 10. To facilitate that dimensioning, a groove 59 is located on the interior of the side 53 to accommodate the screw 47 that protrudes from the annular side wall 53 of the tooling instrument 10.

Figure 6:
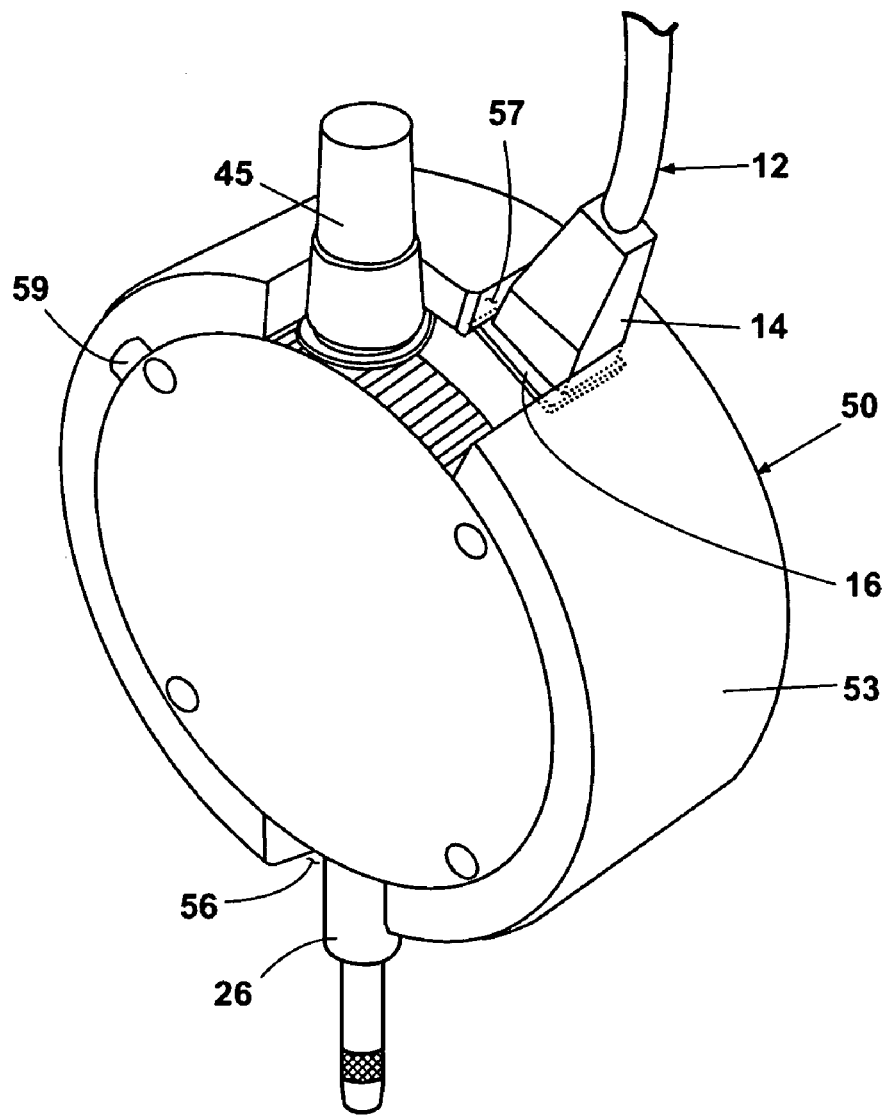
FIG. 6 is a perspective view of the tooling instrument of FIG. 1 incorporating the cable retainer of FIG. 3.

FIG. 6 shows a perspective view of the tooling instrument 10 of FIG. 1 incorporating the cable retainer 50 of FIGS. 3-5. The cable retainer 50 is mounted on the tooling instrument 10.

The central opening 52 provides access to the buttons on the front face of the tooling instrument 10 and allows the user to read the LCD display 40. It can be easily seen that the cutouts 56, 57 and the groove 59 are located such that the tooling instrument 10 fits snugly inside the cable retainer 50. Cutout 57 is also shaped to fit closely around the cable contact member 14 when it is received in the terminal 20. Preferably, a linear dimension of the cutout 57 (e.g. width) is less than a corresponding linear dimension of the small lip 16 on the cable contact member 14 (e.g. width) so that it lies between the annular side wall 53 of the cable retainer 50 and the annular side wall 53 of the tooling instrument 10. Thus, the cable retainer 50 helps to ensure that the SPC cable 12 is held in the terminal 20. The small lip 16 inhibits removal of the cable contact member 14 from the terminal 20. If the cable contact member 14 does not have a small lip 16, the cable retainer 50 can be sized to hold the SPC cable 12 in place by applying force to the sides of the SPC cable 12.

It will be understood that a cable retainer according to the invention can be sized and shaped to accommodate other gage devices to achieve the same purpose of retaining a cable removably connected to a gage device. The cable retainer can be of any material, shape, and dimension suitable to secure an SPC cable 12 in a terminal 20, and simultaneously allow the user access to the controls and/or displays on the instrument, while permitting full functioning of the tooling instrument.

Figure 7:
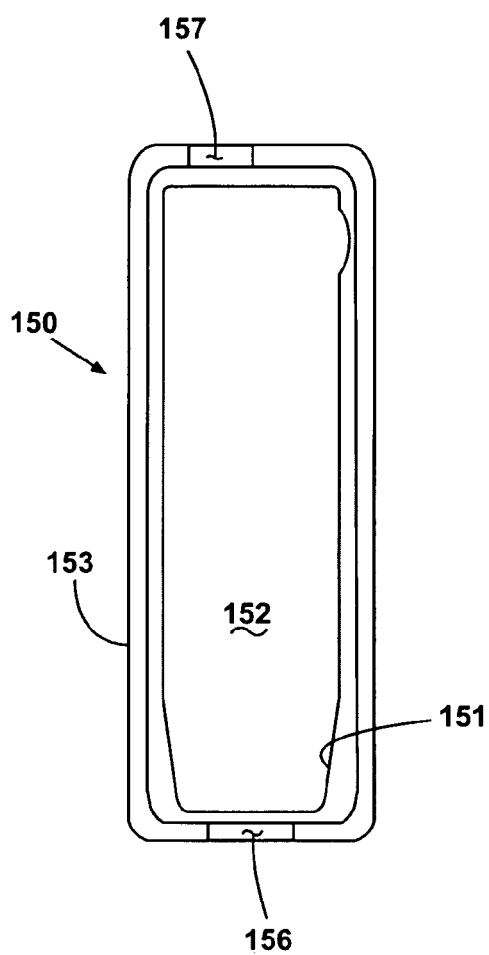
FIG. 7 is a perspective view of an alternative cable retainer that has been modified to fit an alternative tooling instrument.
Figure 8:
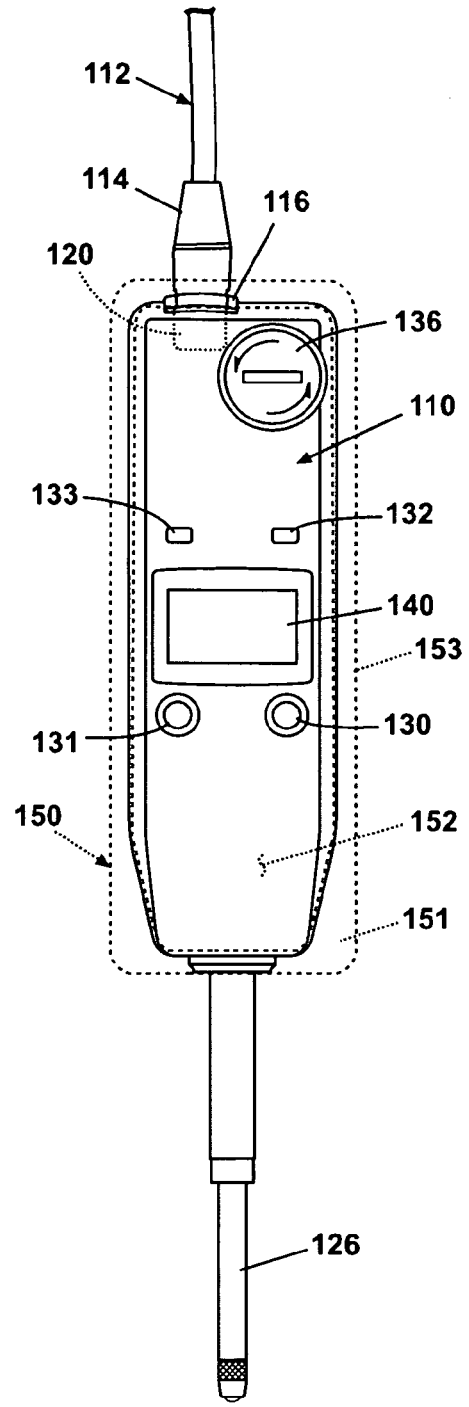
FIG. 8 is a perspective view of the cable retainer of FIG. 7 incorporating the alternative tooling instrument.

For example, FIGS. 7-8 show a perspective view of an alternative cable retainer 150 sized and shaped to fit an alternative tooling instrument 110. The tooling instrument 110 has a spindle 126, several buttons 130-133, a battery cover 136, and an LCD display 140. Located on a top surface of the tooling instrument 110 is a terminal 120 (shown in phantom) where an SPC cable 112, with a cable contact member 114, may be connected. It should be noted that the cable contact member 114 may have a small lip 116.

The cable retainer 150 (shown in phantom in FIG. 8) has as a flat front flange 151 that defines an elongated central opening 152. The cable retainer 150 also has a side wall 153 that extends from the flat front flange 151. The side wall 153 has cutouts 156, 157 that correspond to the items projecting from a side wall of the tooling instrument 110, including a spindle 126 and an SPC cable 112. The side wall 153 tightly fits around the perimeter of the tooling instrument 110. The cable retainer 150 is configured to extend at least partially over the small lip 116 if a small lip 116 is present on the cable contact member 114. However, even if the cable contact member 114 does not have a small lip 116 the cable retainer 150 can be sized to hold the SPC cable 112 in place by applying force to the sides of the SPC cable 112.

While the invention has been specifically described in connection with certain specific embodiments thereof, it is to be understood that this is by way of illustration and not of limitation, and the scope of the appended claims should be construed as broadly as the prior art will permit.

What is claimed is:

1. A device for a tooling instrument having a cable which is removably coupled to the tooling instrument, comprising:
    a cable retainer removably mounted on the instrument and dimensioned to fit closely around substantially the entire perimeter of the tooling instrument;
    wherein, with the cable retainer removably mounted on the tooling instrument, the cable retainer prevents the cable from being removed from the tooling instrument.

2. The device according to claim 1, wherein the cable retainer comprises a cut-out which fits around the cable when the cable retainer is removably mounted on the tooling instrument.

3. The device according to claim 2, wherein the cable retainer comprises at least one additional cut-out which fits around an item projecting from the tooling instrument when the cable retainer is removably mounted on the tooling instrument.

4. The device according to claim 2, wherein the cut-out overlies a portion of the cable to inhibit removal of the cable from the tooling instrument.

5. The device according to claim 4, wherein the cut-out overlies a lip on a cable contact member of the cable to inhibit removal of the cable from the tooling instrument.

6. The device according to claim 1, wherein the cable retainer is configured to apply force to the cable to inhibit removal of the cable from the tooling instrument.

7. The device according to claim 1, wherein the cable retainer comprises a groove which receives a protruding feature on the tooling instrument when the cable retainer is removably mounted on the tooling instrument.

8. The device according to claim 1, wherein the cable retainer comprises an opening which allows a user to access at least one of a control and a display of the tooling instrument when the cable retainer is removably mounted on the tooling instrument.

9. The device according to claim 1, wherein the cable retainer is formed from a rigid plastic material.

10. The device according to claim 1, wherein the cable retainer is formed from a flexible material.

* * * * *